United States Patent [19]

Sheek

[11] Patent Number: 4,509,888
[45] Date of Patent: Apr. 9, 1985

[54] TRACK FASTENER

[75] Inventor: Roy S. Sheek, Yadkinville, N.C.

[73] Assignee: Fairchild Industries, Inc., Germantown, Md.

[21] Appl. No.: 405,043

[22] Filed: Aug. 4, 1982

[51] Int. Cl.$^3$ .............. B60P 7/00; B61D 45/00; B64D 9/00
[52] U.S. Cl. .............. 410/105; 244/118.1; 244/118.6; 244/122 R; 410/115
[58] Field of Search .......... 244/118.1, 118.6, 122 R; 410/101, 102, 104, 105, 115

[56] References Cited

U.S. PATENT DOCUMENTS

| | | | |
|---|---|---|---|
| 3,605,637 | 9/1971 | Prete, Jr. ......................... | 410/105 |
| 4,026,218 | 5/1977 | Prete, Jr. et al. .................. | 410/104 |
| 4,230,432 | 10/1980 | Howell ......................... | 410/105 X |
| 4,256,424 | 3/1981 | Knox et al. ..................... | 410/105 |
| 4,369,010 | 1/1983 | Ichinose et al. .................. | 410/101 |
| 4,376,522 | 3/1983 | Banks ........................... | 244/118.6 |

Primary Examiner—Robert B. Reeves
Assistant Examiner—Howard Beltran
Attorney, Agent, or Firm—Michael W. York

[57] ABSTRACT

Track fastener apparatus for use with a vehicle locking track located within a vehicle such as an aircraft or the like, that includes a bracket member having portions thereof locatable around a portion of the locking track for restraining portions of the locking track from bulging outward when the track fastener is subjected to large loads such as would occur when the vehicle is subjected to a crash. The track fastener has a body portion and the bracket member is connected to the body portion by a bolt so that the bolt can be tightened to clamp the lower portion of the bracket member against the locking track, and hence, reduce or eliminate rattle between the locking track and the track fastener. By loosening the bolt, it is also possible to readily slide the track fastener along the locking track or remove the track fastener from the locking track. The bracket member increases the load which can be exerted upon the track fastener and locking track, and hence, greatly reduces the likelihood of an aircraft seat, or the like, which is connected to the track fastener from coming loose when an aircraft is subjected to a crash.

9 Claims, 5 Drawing Figures

TRACK FASTENER

BACKGROUND OF THE INVENTION

Various vehicles such as aircraft need the capability to permit the rapid removal and/or addition of cargo and/or passenger seats. Such vehicles also need the capability of permitting the rapid repositioning of seats and/or cargo within the vehicle. These needs are particularly required in passenger and cargo type aircraft.

These requirements are commonly met by providing a number of locking tracks which run lengthwise in the floor of the aircraft. These locking tracks commonly have a slot which would generally run the entire length of the locking track. Semi-circular cut out portions would generally extend outward from the slot and are generally located at equally spaced distances along the locking tracks. These semi-circular cut out portions would also be interconnected by a smaller slot which runs lengthwise in the upper surface in the locking track. The purpose of the slot and cut out portions is to receive portions of track fasteners which would be used to secure cargo and/or passenger seats to the locking tracks. Through the use of such track fasteners in the locking tracks, it is easy to remove and/or add cargo and/or passenger seats to or from the aircraft. In a similar manner the locking tracks and associated track fasteners permit passenger seats and/or cargo to be rapidly repositioned within the aircraft.

Also such locking tracks and associated track fasteners have worked out reasonably satisfactory. In terms of normal use they have had certain deficiencies in terms of adequately securing aircraft seats and possibly cargo to the floor of the aircraft when the aircraft is subject to rapid deacceleration which would occur when the aircraft is subjected to a crash. In these instances rather high forces are exerted on the track fasteners and the associated portions of the locking tracks to which the track fasteners are connected. In some instances the track fasteners have actually been pulled loose from the locking tracks. This has resulted in the passenger seat becoming loose from the floor of the aircraft and being propelled within the aircraft which greatly increases the chances of injury or death to the occupants of that seat or other occupants in the aircraft.

Consequently a need exists to insure that the track fasteners remained secured to the associated locking tracks when the aircraft is subjected to a crash. Unfortunately, it has been determined that in many instances it is the failure of the locking track that results in the track fastener becoming loose from the associated locking track. In particular it has been determined that the upper portion of the locking track, including the narrow slot, spreads apart due to the upward exerting forces upon the track fasteners and this results in the release of the track fasteners. One possible solution for this problem might be to attempt to strengthen the locking tracks themselves; however, even if such a solution was possible this would require the retro fitting of many existing aircraft.

This invention overcomes the problem associated with the present locking tracks and associated track fasteners. In addition this invention does not require any change to the existing locking tracks. This invention provides a track fastener which in addition to performing its normal locking function to secure the track fastener to the locking tracks also prevents an adjacent portion of the locking track from spreading apart to permit release of the track fasteners.

SUMMARY OF THE INVENTION

This invention relates to track fastener apparatus and more particularly to track fastener apparatus for use with locking tracks located in vehicles.

It is accordingly an object of the present invention to provide a track fastener apparatus which can be securely fastened to a locking track within a vehicle.

It is an object of the present invention to provide track fastener apparatus which when connected to a locking track is capable of withstanding large forces which may be exerted upon the locking track apparatus.

It is an object of the present invention to provide track fastener apparatus which is capable of reenforcing a portion of a locking track when its connected to the locking track.

It is also an object of the present invention to provide a track fastener apparatus which reduces or eliminates distortion of the associated connected portion of the locking track when the track fastener has large forces exerted upon it.

It is also an object of the present invention to provide track fastener apparatus which reduces the possibility of an associated vehicle seat being pulled loose from the floor of a vehicle such as an aircraft or the like.

It is also an object of the present invention to provide a track fastener apparatus which increases the safety of occupants in a vehicle such as an aircraft or the like.

It is also an object of the present invention to provide a track fastener apparatus which is more capable of securing cargo and/or an aircraft seat to the floor of an aircraft.

It is also an object of the present invention to provide track fastener apparatus which is easy to manufacture.

It is also an object of the present invention to provide track fastener apparatus which is relatively inexpensive in terms of its increased holding ability when connected to a locking track.

It is also an object of the present invention to provide track fastener apparatus which is easily locked in place to a locking track.

It is also an object of the present invention to provide track fastener apparatus which is easily movable along a locking track when it is in its unlocked configuration.

It is also an object of the present invention to provide a track fastener apparatus which can permit the use of a lighter weight locking track and yet retain substantially the same strength when the track fastener apparatus is locked in place.

It is also an object of the present invention to provide a track fastener apparatus which resists tearing out of the locking track to which it is connected.

It is also an object of the present invention to provide a track fastener apparaus which permits safe use of locking track into a reduced load capacity since the loading for the combined track fastener apparatus and locking track can be based upon the bending failure of the locking track.

It is also an object of the present invention to provide a track fastener apparatus which eliminates any movement between the track fastener and the locking track.

It is also an object of the present invention to provide a track fastener apparatus which eliminates rattle between the track fastener and the locking track.

The present invention provides track fastener apparatus for use with a locking track which includes a track fastener and a bracket associated with the track fastener for being located around a portion of the locking track to assist in preventing a portion of the locking track from bulging outward when forces are applied to the track fastener means.

BRIEF DESCRIPTION OF THE DRAWINGS

The invention will be hereinafter more fully described with reference to the accompanying drawings in which.

DETAILED DESCRIPTION OF THE PREFERRED EMBODIMENT

Figure 1:
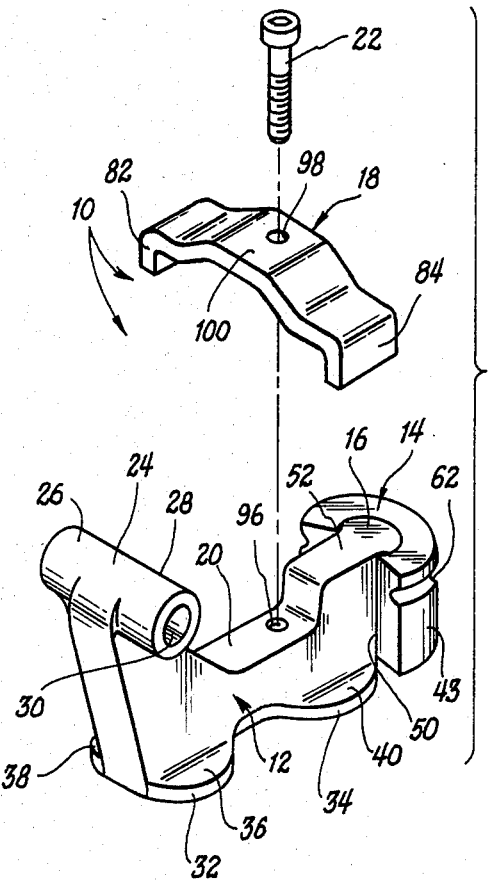
FIG. 1 is an expanded perspective view of the track fastener of the present invention.

The track fastener of the invention is illustrated in FIGS. 1, 2, 3, and 5 and is designated generally by the number 10. The track fastener 10 comprises a body portion 12 and associated plunger assembly 14 which is located on the forward portion 16 of the body member 12. The track fastener 10 also comprises a strap or a bracket member 18 which is connectable to the upper middle portion 20 of the body member 12 through the use of the bolt 22.

The body member 12 has a rear upward projecting portion 24 which has outward extending generally cylindrical shaped portions 26 and 28, and an aperture 30 extends completely through these cyclindrical portions 26 and 28 and through the entire upward projection portion 24. The purpose of this aperture 30 is to receive a bolt or the like (not shown) which can be used to connect the body portion 12 to a leg of an aircraft seat or the like. The lower portion of the body member 12 has two substantially identical stud portions 32 and 34. These stud portions are substantially identical and they have outward extending substantially semi-circular shaped outward extending portions 36 and 38 and 40 and 42 which are located on opposite sides of the body member 12.

The plunger assembly 14 comprises a semicylindrical shaped plunger member 43 which has a generally circular aperture 44 extending through it from its upper surface to its lower surface. This aperture 44 is sized to accept a generally cylindrical protruding portion forward portion 16 of the body member 12. The rear portions of the plunger member 43 have been cut away so that a slot 50 is located in the rear exterior of the plunger member 43. This slot 50 is sized and shaped to receive a recessed portion 52 which is located just to the rear of the forward portion 16 of the body member 12. The outer upper exterior surface of the plunger member 43 has a large recess 62, which permits an individual to readily grasp the upper portion of the plunger member 43 so that it can be manually pulled upward or pushed down.

Figure 3:
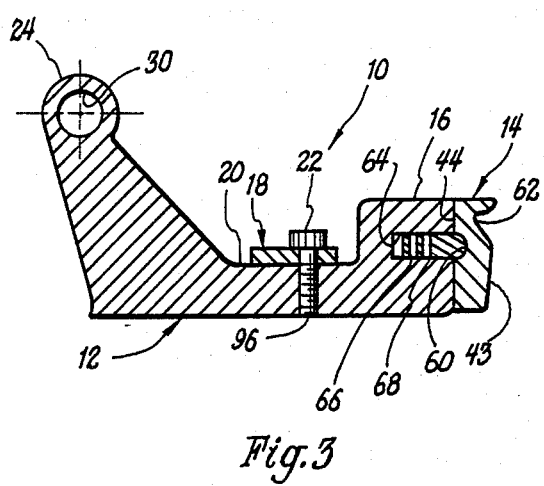
FIG. 3 is a sectional view of the track fastener illustrated in FIG. 2 taken substantially on the line 3—3 thereof.

As best illustrated in FIG. 3, a circumferential groove 60 is located in the middle portion of the aperture 44 of the plunger member 43. The forward portion 16 of the body member 12 also has a small circular aperture 64 and located within this aperture 64 is a spring 66 and a generally cylindrical pin member 68. The spring 66 biases pin member 68 in an outward direction so that the pin member 68 moves in to the circumferential recess 44 when the plunger member 43 is in its downward or locked position so that plunger member 43 does not tend to move to its upward or unlocked position until its manually moved into that position.

Thus far the portions of the track fastener 10, except the bracket member 18 and the associated bolt 22, are in themselves not part of the invention since they represent what is typical in the prior art. However, when these portions are combined with the strap or bracket member 18, new and unexpected results are obtained which will be hereinafter described in detail.

Figure 4:
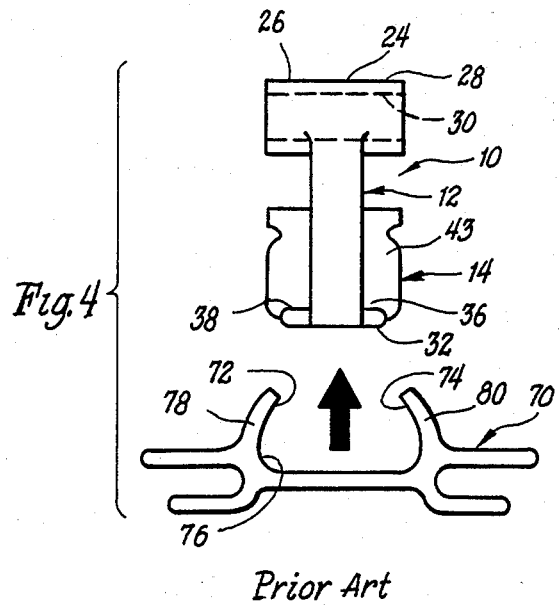
FIG. 4 is an expanded end elevational view of a prior art track fastener and associated locking track showing how failure would occur with the prior art track fastener.
Figure 2:
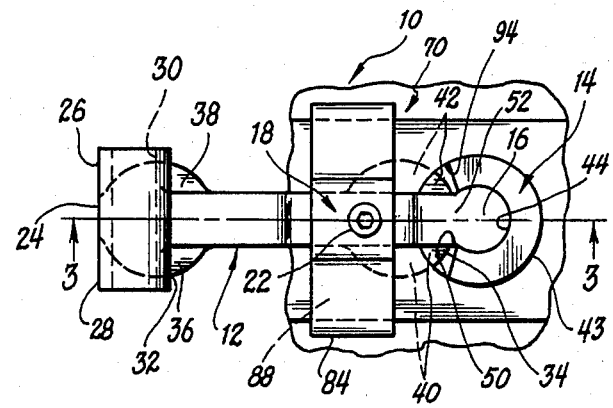
FIG. 2 is a top plan view of the track fastener illustrated in FIG. 1.

In FIG. 4 a prior art track fastener is illustrated which includes a body member 12 and the associated plunger assembly 14. The body member 12 is secured to a locking track such as the locking track 70 illustrated in FIG. 4 by the outward extending portions 36 and 38 and 40 and 42 whose upper surfaces engage the underside surfaces 72 and 74 of the locking track channel 76 in a manner well known to those skilled in the art. The plunger member 43 of the plunger assembly would also be pushed into its downward or locked position as illustrated in FIG. 5 to prevent forward or aft movement of the body member and the plunger assembly 14 in a manner well known to those skilled in the art.

Unfortunately, with the prior art track fastener and the associated locking track illustrated in FIG. 4, when a large force is exerted upon a seat or the like (not shown), which is connected to the track fastener body member 12, such as would occur when an airplane crashes, this causes a huge upward force to be exerted on the body member 12. This upward force is in turn transmitted to the underside surfaces 72 and 74 of the locking track channel 76 by the outward extending portions 36 and 38 and 40 and 42 of the body member 12. When the upward force is sufficiently large, it causes distortion of the locking track 70 in the manner illustrated in FIG. 4 where it can be seen that the portions of the locking track 78 and 80, which are associated in the surfaces 72 and 74 are pushed outward, and this results in the release of the track fastener and its body member 12, which is connected to the seat or the like (not shown).

This distortion of the locking track 70, associated with prior art track fasteners, is a very serious matter since it will result in the aircraft seat or the like becoming unattached from the aircraft, and this permits the aircraft seat or the like to be thrown about within the aircraft with very serious consequences, including severe injury or death to the occupants of the seat or other passengers within the aircraft. Consequently, there is a serious need to prevent or reduce this distortion associated with prior art track fasteners and the associated locking track 70. Fortunately, this need has been fulfilled with the track fastener 10 of this invention in a manner which will be hereinafter more fully described in detail.

Figure 5:
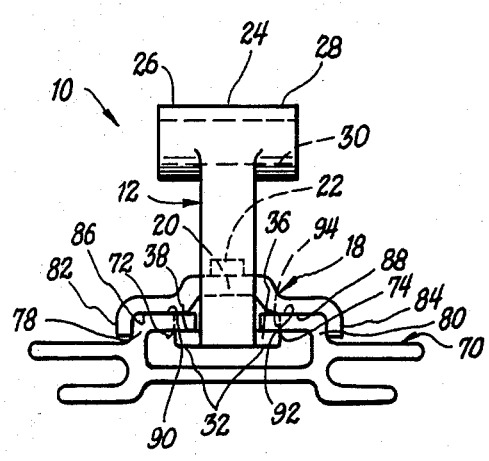
FIG. 5 is an end elevational view of the track fastener illustrated in FIGS. 1, 2, and 3 illustrating how it is utilized in connection with an associated locking track.

FIG. 5 illustrates the use of the track fastener 10 of the invention in connection with an undistorted locking track 70. As illustrated when the track fastener 10 is in its locked position, the strap or bracket member 18 has downward extending flange portions 82 and 84 which fit around the sides of the upper locking track portions 78 and 80. Consequently, the bracket member 18 comprises structure for reinforcing a portion of the locking truck 70 for preventing the portions 78 and 80 of the locking track 70 from bulging outward when upward forces are applied to the track fastener 10, which would cause the outward extending portions such as the portions 36 and 38 of the track lugs or stud portions such as the portion 32, to exert an upward and outward force against the lower surfaces 72 and 74 of the lips of the locking track 70. As illustrated in FIG. 5, the bracket member 18 is secured into place by the bolt or fastening means 22 after the other portions of the track fastener 10 have been inserted into their locked positions in the locking track 70. When this is done, the lower surfaces 86 and 88 of bracket 18 exert pressure against the respective upper surfaces 90 and 92 of the respective upper portions 78 and 80 of the locking track 70. This pressure tends to reduce or eliminate rattle between the track fastener 10 and the locking track 70 and hence the bracket member 18 also comprises structure for reducing or eliminating rattle between the track fastener 10 and the locking track 70.

Even though the strap or bracket member 18 can be secured by the bolt 22 to prevent rattle or movement between the track fastener 10 and the locking track 70, the bolt 22 can be loosened to allow the member 18 to be moved upward. When this is done and the plunger member 43 is moved to its upper or unlocked position, the track fastener 10 can then be slid along the track 70 in a conventional member known to those skilled in the art and as described in U.S. Pat. No. 4,230,432. In a similar manner, the track fastener 10 can be removed from the locking track 70 by properly positioning the track lugs such as the lug 32 so that it can be lifted upward though the apertures such as the aperture 94 in the locking track in a conventional manner known to those skilled in the art, which is also described in U.S. Pat. No. 4,230,432. In view of this arrangement the fastening means such as the bolt 22 and the bracket member 18 which is formed separately from the body member 12 comprise structure for permitting the track fastener to be moved along the locking track 70 and/or removed from the locking track 70.

The locking track apparatus 10 is manufactured and used in the following manner. Normally the entire body portion 12 will be formed from a suitable steel by either forging or casting. Then the aperture or hole 64 would then be drilled into the end of the body member 12 and also hole 96 would be drilled and tapped into the upper central portion 20 of the body member 12 for receiving the threaded portion of the bolt 22. In addition the aperture or hole 30 would also be drilled through the upper aft portion of the body member 12. The plunger member 43 is then suitably machined from a suitable steel and then the plunger assembly 14 is assembled to the body portion by inserting the spring 66 and then the pin member 68 into the hole 64 and then pushing the plunger member upward so that its aperture 44 accepts the protruding portion 16 of the body member in a manner known to those skilled in the art. The strap or bracket member 18 is then individually formed by forging or the like or is cut from a larger piece of stock in a manner known to those skilled in the art. A hole 98 is then drilled through the central portion 100 of the bracket member 18 to permit the threaded portion of the bolt 22 to pass through the hole.

The track fastener 10 is used in the following manner. The track fastener 10 would be suitably connected to the lower portions of the aircraft seat legs or the like (not shown) by the use of a suitable bolt and nut or the like by inserting the bolt through the hole 30 in the upper aft and of the body member 12. Prior to doing this, the bracket member 18 would be loosely connected to the body member 12 by passing a portion of the bolt 22 through the hole 98 in the central portion 100 of the bracket member 18 and then threading a portion of the bolt 22 into the threaded aperture 96 in the central upper portion 20 of the body member 12. The body member 12 would then be suitably located on the top of the locking track 70 so that the track lugs 32 and 34 could pass through the appropriate apertures such as the aperture 94 in the upper portion of the locking track 70. This would be accomplished with the plunger member 43 in its unlocked or upper position.

The track fastener 10 and the attached seat (not shown) could then be moved along the locking track 70 to a suitable location. Then the seat could be locked in piece by moving the track fastener 10 until the plunger member 43 could be pushed to an adjacent aperture such as the aperture 94 in the upper portion of the locking track 70 in a manner known to those skilled in the art, which is also set forth in U.S. Pat. No. 4,230,432. The bolt 22 would then be tightened to clamp the bracket member 18 downward so that its lower surfaces 86 and 88 were pressed against the upper surfaces 90 and 92 of the locking track 70 and so that the downward projection flange portions 82 and 84 of the bracket member are located around the upper side portions of the track 70. When desired, the aircraft seat could be easily moved by loosening the bolt 22 and lifting the plunger member 43 upward to its unlocked position or if desired the entire seat can be moved from the locking track by suitably positioning the track lugs 32 and 34 so that they were located under the aperture such as the aperture 94 illustrated in FIG. 5. The seat and the connected track fastener can then be lifted upward and be removed from the aircraft.

Although the invention has been described in considerable detail with reference to certain preferred embodiment, it will be understood that variations and modifications may be made with the spirit and scope of the invention as defined in the appended claims.

What is claimed is:

1. Track fastener apparatus for use with a locking track having an upper surface and sides comprising a track fastener body, means associated with said track fastener body for securing said track fastener body to said locking track and means associated with said track fastener body and having portions thereof locatable around at least portions of the sides of said locking track for reinforcing a portion of said locking track for preventing the side portions from bulging outward when forces are applied to said track fastener body.

2. The track fastener apparatus of claim 1 wherein said means for reinforcing a portion of said locking track comprises a bracket member.

3. The track fastener apparatus of claim 2 wherein said bracket member has downward extending flange portions for fitting around the outside of the upper sides of said locking track.

4. The track fastener apparatus of claim 3 wherein said bracket member has a lower surface and wherein at least a portion of the lower surface of said bracket member generally conforms to the shape of at least a portion of the upper surface of said locking track.

5. The track fastener of claim 4 wherein said bracket member also comprises means for controlling rattle between said track fastener body and said track.

6. The track fastener of claim 5 further comprising means for assisting said track fastener body to slide along said locking track.

7. The track fastener of claim 6 wherein said slide assisting means also comprises means for allowing said track fastener body to be removed from said locking track.

8. The track fastener of claim 7 wherein said slide assisting means and said track fastener body removal means comprise means for loosening said bracket member from said track fastener body.

9. The track fastener of claim 8 wherein said mens for loosening said bracket member also comprises means for connecting said bracket member to said track fastener body.

* * * * *